April 19, 1966 W. JOHNSON 3,246,518
TANK GAUGE SYSTEM AND LEVEL RESPONSIVE DEVICE THEREFOR
Filed Dec. 13, 1961 3 Sheets-Sheet 1
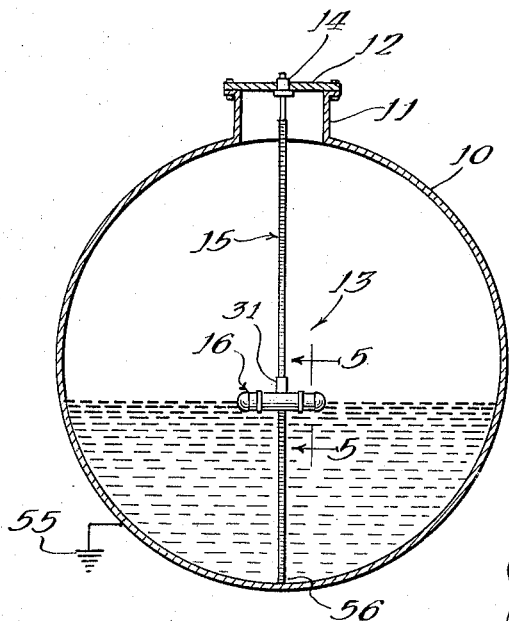
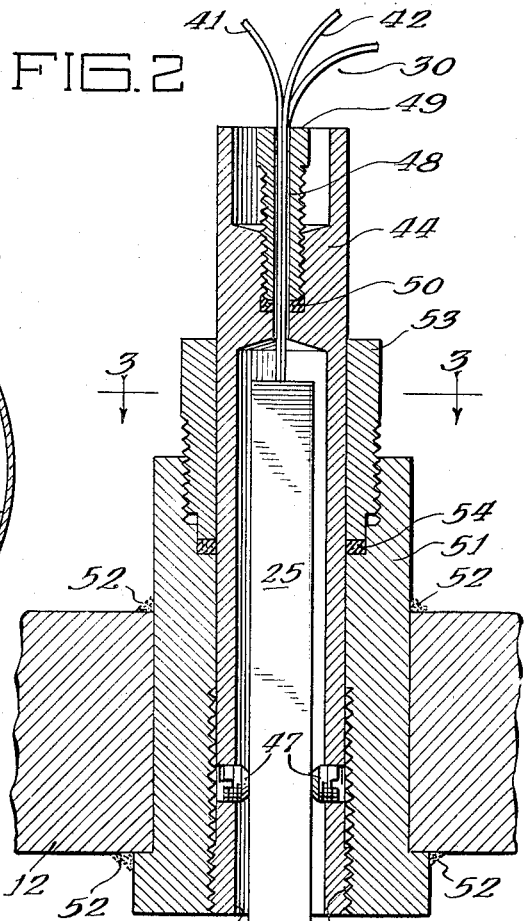
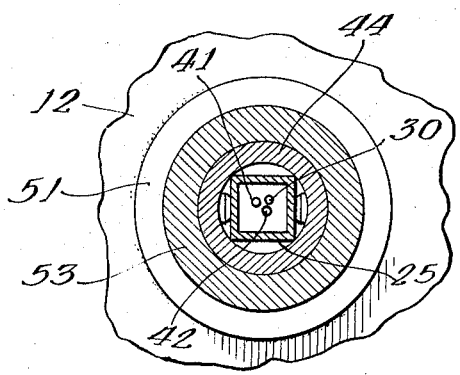
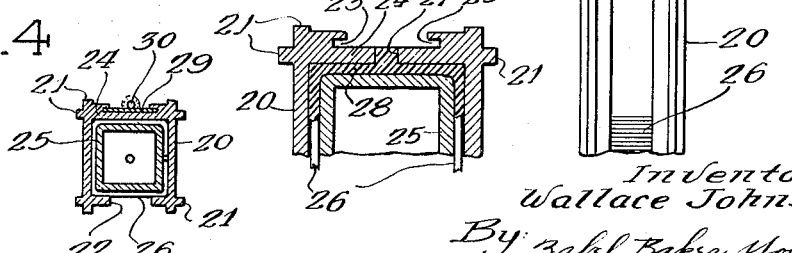
Inventor:
Wallace Johnson
By Zahl, Baker, York,
Jones & Sithrau
Attorneys April 19, 1966 W. JOHNSON 3,246,518
TANK GAUGE SYSTEM AND LEVEL RESPONSIVE DEVICE THEREFOR
Filed Dec. 13, 1961 3 Sheets-Sheet 2
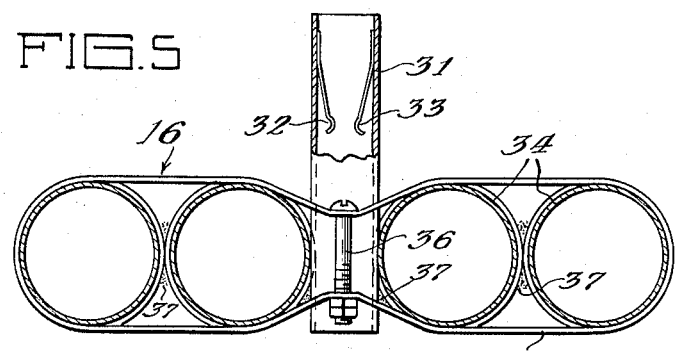
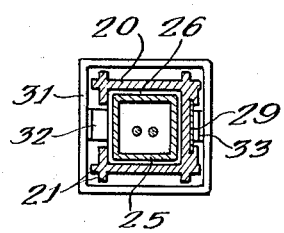
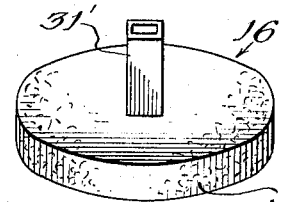
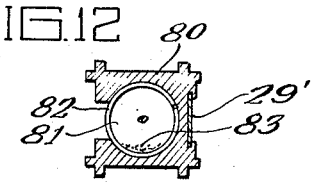
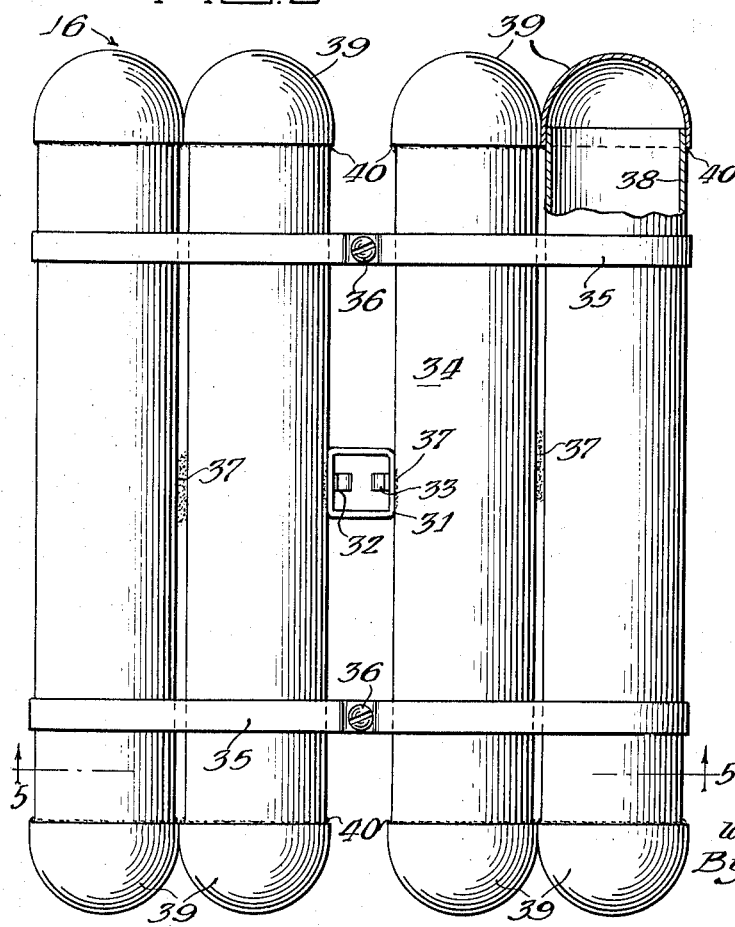
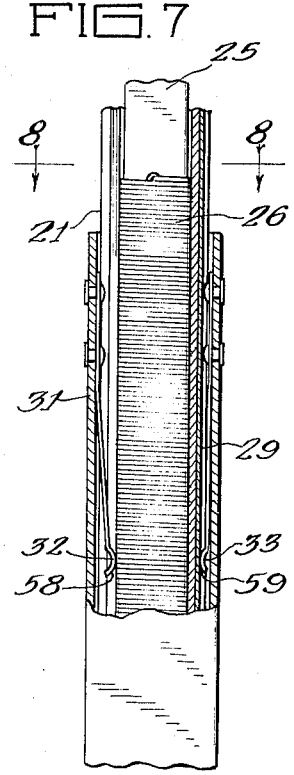
Inventor:
Wallace Johnson
By Zabel, Baker, York,
Jones & Dithmar
Attorneys

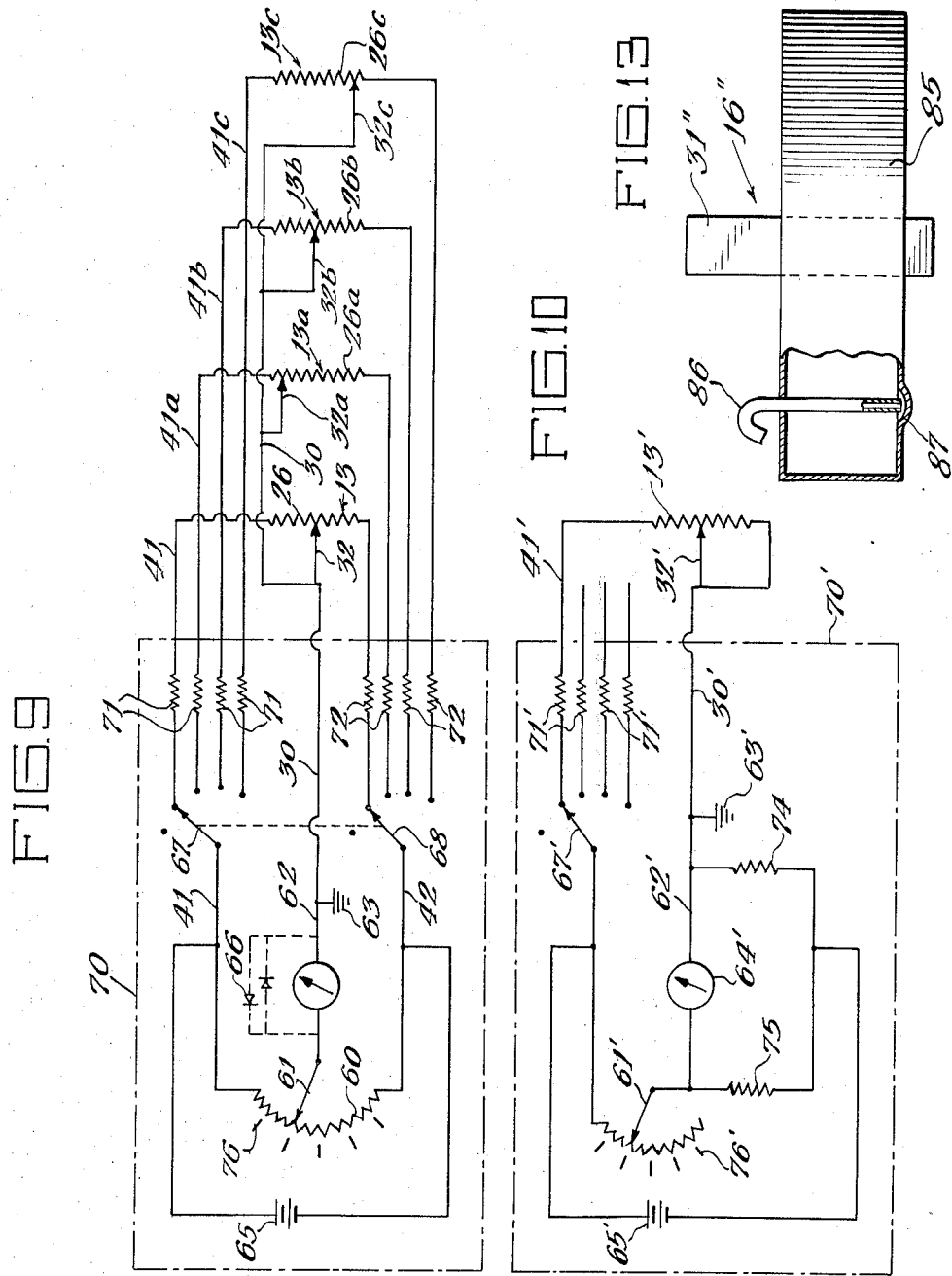

United States Patent Office 3,246,518
Patented Apr. 19, 1966

3,246,518
TANK GAUGE SYSTEM AND LEVEL RESPONSIVE DEVICE THEREFOR
Wallace Johnson, Macomb, Ill., assignor to Liquid Levels Lectronics Incorporated, a corporation of Illinois
Filed Dec. 13, 1961, Ser. No. 158,998
17 Claims. (Cl. 73—313)

This invention relates to a tank gauge system and a level responsive device therefor.

The embodiment of the invention shown herein is particularly well adapted for use in pressure vessels, such as those used for storing propane and butane, but my invention is also suitable for use with non-pressurized storage vessels such as those used for naphtha, carbon dioxide, corn products, anhydrous ammonia, refrigerants, and other liquids having a high dielectric strength.

It is an object of my invention to provide an improved level indicating system which can be used in a tank farm so that the level of any one of a number of tanks can be measured from a central location. Since some tank farms or storage facilities have as many as a hundred tanks, it becomes important to provide a system which is relatively simple both electrically and mechanically.

The level responsive device in itself is of a simplified constuction which permits a number of such devices to be electrically connected with a common electrical indicating means which also includes switching mechanism so that the level in any one of the devices can be checked instantaneously by actuating the switch mechanism.

One of the problems encountered in a level responsive device of this type, which forms a part of an electrical circuit, is that of avoiding any sparking which would create an explosion hazard.

According to my invention I have provided a level indicating device which includes an electric circuit which can be energized by a source of potential of low voltage and low electrical capacity, as the term is used in the battery art. More particularly, my system can be powered by two flashlight batteries, and the device is operative even though there may be one or two miles of wire connecting the level responsive device with the indicating mechanism.

Furthermore, the system may be arranged so that the mechanical elements of the level responsive device are at ground potential, thus eliminating the use of insulating materials in the mounting means. This avoids the problem of sparking due to failure of insulation.

It is a further object of my invention to provide, for the tank end of such a system, an improved level responsive device which is of a simplified mechanical construction. More particularly, the level responsive device is a float actuated rheostat which contains no moving parts other than the float, which requires no flexible electrical connection between the float and the external circuit elements, and which embodies means which are effective to make good electrical contact without the use of special mechanism which has to be actuated for each reading in order to urge the contact member into engagement with the resistance element.

Another object of my invention is to provide an improved sliding contact float device which is free from cocking and binding so that it will operate for many months without requiring inspection, adjustment, or repair.

According to this aspect of my invention, the buoyant means of the float device is disposed on opposite sides of a sliding sleeve member so as to provide a balanced force which will minimize cocking, the sleeve member being of substantial length so as to avoid binding.

Still another object is to provide a float device which is operative under the extremely high pressures encountered in this art.

A further object of my invention is to provide a level responsive device in which the coil supporting member also serves as a guide for the float, thus dispensing with a separate guide member for the float.

Other objects, features, and advantages of my invention will become apparent as the description proceeds.

With reference now to the drawings in which like reference numerals designate like parts:

FIG. 1 is a vertical sectional view through a pressure storage tank, showing a preferred embodiment of my invention;

FIG. 2 is an enlarged axial section through the pressure seal;

FIG. 3 is a horizontal section taken along line 3—3 of FIG. 2;

FIG. 4 is a horizontal section taken along the line 4—4 of FIG. 2;

FIG. 4a is an enlarged section similar to FIG. 4 but showing the manner in which the parts are united to each other;

FIG. 5 is a vertical section showing the float device, taken along line 5—5 of FIG. 1;

FIG. 6 is a plan view of the float device shown in FIG. 5;

FIG. 7 is a view, partly in section, showing the cooperation of the float device with the float guide;

FIG. 8 is a horizontal section taken along line 8—8 of FIG. 7;

FIG. 9 is an electrical diagram of the system;

FIG. 10 is an electrical diagram showing a modified form of the invention;

FIG. 11 is a perspective view of a modified float device;

FIG. 12 is a horizontal section showing a modification of the float guide; and

FIG. 13 shows a further modified float device.

With reference now to FIG. 1, the reference numeral 10 indicates a pressure tank for the storage of a liquid hydrocarbon. The tank is provided with a manhole 11 and a manhole cover 12. A level responsive device 13 is disposed within the tank 10 and it is mounted in the top portion of the tank, such as the cover 12, by means of a pressure seal 14, and it extends down to the bottom of the tank. The level responsive device comprises a vertically disposed float guide 15 and a float device 16 which cooperates therewith.

The support member, as shown in FIGS. 4 and 4a comprises a shell 20 which is preferably in the form of an aluminum extrusion having an anodized surface, although it may be made out of an extrusion of a suitable resin material which is stable with respect to the contents of the tank. The shell 20 is provided with lands 21 at each corner. One side of the shell is provided with a continuous slot 22 so that the shell is U-shaped. The opposite side of the shell is provided with undercut slots 23 (FIG. 4a) at a point adjacent the opposite wall 24.

A resistance element, preferably in the form of a coil of resistance wire 26, is received within the shell 20 so that a portion thereof is exposed through the slot 22. Thus, the shell 20 serves both as a guide for the float device 16 and a mounting means for the resistance wire 26. In the preferred arrangement, the resistance wire 26 is wound on a hollow core element 25 which may also be formed of anodized aluminum. The resistance wire 26 is preferably provided with a coating of insulating enamel or other insulating material such as Formvar. At the point opposite the slot 22, the coating is removed, as by buffing.

In the arrangement shown, the parts are bonded together so that the core 25 serves to reinforce the shell 20 to provide a comparatively rigid structure. The parts are of a relatively loose fit to permit ease of assembly. As shown in FIG. 4a, the bonding is effected by a suitable bonding material such as an epoxy resin 28. The wall 24 of the shell is provided with one or more apertures 27, and after the core and shell have been assembled, but prior to the insertion of the hereinafter mentioned conductor strip 29, the resin 28 is injected into the space between the shell 20 and the core 25 to secure the core with respect to the shell and also to provide periodically spaced anchors for the convolutions of the resistance wire 26.

After the parts have been thus assembled, a conductor strip 29 is inserted in the undercut slots 23 and overlies the wall 24.

A modified arrangement is shown in FIG. 12 in which the core has been omitted. Here the float guide comprises an extruded element 80 of anodized aluminum and having an undercut recess 81 formed in one wall thereof, and a resistance coil 82 disposed in the recess 81. A conductor strip 29' is mounted in the opposite surface. The convolutions of the resistance coil 82 may be held in place in the recess 81 by frictional engagement (the coil having been maintained in a wound up condition at the time of insertion), but preferably I provide a suitable cement or resin 83 to anchor convolutions to the bottom of the recess 81.

The resistance wire 26 may be formed of any standard nickel chromium alloy suitable for this purpose, and the conductor strip 29 may be formed of the same material. For use with butane, propane, and the like, I have found Karma wire to be suitable, this being an alloy of 73% nickel, 20% chromium, and the remainder being aluminum and iron.

A lead 30 (FIG. 2) is brought through the wall of the core 25 and extended upwardly through the interior of the core and the pressure seal 14.

Aluminum or aluminum alloy is a preferred material for the shell and the core for the reason that it can be extruded, it is of light weight, and the surface can readily be rendered both wear resistant and substantially non-conducting by anodizing.

The float device 16 includes contact means for making a connection between the resistance wire 26 and the conductor strip 29 so as to regulate the amount of resistance in one or more arms of a bridge circuit. The float device 16 includes a rectangular sleeve 31, preferably of aluminum, which is loosely mounted on the shell 20 and makes sliding contact with the lands 21. The inner surface of the sleeve 31 carries oppositely disposed spring biased contact arms 32 and 33, preferably having gold contact points 58 and 59. Contact arm 32 engages the resistance wire 26 and contact arm 33 engages the conductor strip 29. This arrangement is shown in FIGS. 5, 7 and 8. Contact arms 32 and 33 are electrically connected to each other by the material of the sleeve 31.

The float device 16 also includes four tubular float members 34, two being disposed on each side of the sleeve 31. The float members 34 are secured to each other and urged inwardly into contact with the sleeve by bands 35 and two screws 36. Epoxy welds 37 also secure the parts to each other.

I have found that the ordinary type of hollow float is not suitable for use in a butane pressure vessel because it is likely to collapse under the extremely high pressures encountered, which may be of the order of 300 pounds per square inch. Therefore, I have found that a very effective non-collapsible float means can be formed by using several tubular float members which are of substantial length, but of a diameter which is sufficiently small with respect to the strength of the material as to withstand the pressures involved. As shown in FIG. 6, each float member 34 comprises a tubular section 38 having hemispherical end caps 39 which are secured to each other by epoxy welds 40.

Thus, a rigid and non-collapsible float structure is provided in which the ratio of displacement volume to sliding contact friction is sufficiently great as to render the same sensitive to changes in the liquid level of the order of one-tenth of an inch, when installed in a propane tank. The large surface area and the distribution of area provides a balanced force acting on the sleeve 31 which, when coupled with the substantial sleeve length, is effective to prevent binding and cocking of the float means 16.

FIG. 11 shows a modified type of float device 16', in which the float member 34' is formed of foamed metal, such as aluminum or magnesium, this material being described in U.S. Patent No. 2,751,289, dated June 19, 1956.

FIG. 13 shows a further modification, the float device 16" being a vented self bailing float comprising a hollow float member 85. A vent tube 86 extends through the upper wall thereof, the lower end terminating in a sump 87. The vent tube permits the interior of the float member 85 to be at the same pressure as the interior of the tank 10. Should any liquid condense within the float due to temperature or pressure changes it would accumulate in the sump and consequently any slight temperature or pressure change would create a pressure differential sufficient to force the liquid out.

The ends of the coil of resistance wire 26 are brought through the wall of the core 25 and extend upwardly through the core, as shown in FIGS. 2 and 4 to provide leads 41 and 42 which extend out through the pressure seal 14, similar to the lead 30.

The upper end of the core 25 is received within the recess 46 of a hollow plug 44 and is secured in place by set screws 47. The plug 44 has a small bore 48 for accommodating the leads 30, 41 and 42, and is further provided with a threaded counter bore for receiving a hollow packing screw 49, and packing material 50. Thus the float guide 15 at its upper end is mounted in and suspended from the plug 44. The plug 44 is provided with screw threads 45 which cooperate with a similarly threaded portion of a flanged bushing 51. The bushing 51 extends through the manhole cover 12 and is welded thereto at points 52. Surrounding the plug 44 at its upper portion is a screw threaded packing collar 53 which cooperates with the bushing 51 and packing material 54 to provide a pressure seal between the plug 44 and the bushing 51.

The system as a whole is shown in the electrical diagram of FIG. 9. A rheostat 60 is connected at each end across the leads 41 and 42. The rheostat has a contact arm 61, and a bridge connection 62 extends from the contact arm 61 to the sliding contact 32 through the lead 30 which is common to each of the several level responsive devices shown. The bridge connection 62, or the common lead 30 which forms a part thereof, is preferably grounded as at 63. A galvanometer 64 is interposed in the bridge connection 62. A low voltage, low electrical capacity battery 65 is connected across leads 41 and 42. Thus a bridge circuit is provided of which the rheostat 60 forms the two arms of one branch, and the resistance coil 26 forms the two arms of the other branch. The sliding contact 32 of the float device 16 separates the two right hand arms, and the contact arm 61 separates the two left hand arms.

Adjustment of the arm contact 61 in one direction or the other will cause the position of the needle of the galvanometer 64 to move in one direction or the other. When the needle reads zero, then the position of the contact arm 61 indicates the level in the tank 10. Voltage limiting diodes 66 may be connected across the galvanometer 64.

As shown in FIG. 9, the leads 41 and 42 may be connected by means of ganged switches 67 and 68 to any one of a plurality of level responsive devices 13, 13a, 13b, and 13c, located in as many different tanks. The common portion of the circuit constitutes the control station 70 which may be placed at any convenient location. Adjustable resistances 71 may be included in leads 41, 41a, 41b and 41c to compensate for the variation in line length, and similar adjustable resistances 72 may be provided with respect to the leads 42, 42a, 42b, and 42c.

I have found for instance, that when the resistance of each branch of the bridge circuit is in the neighborhood of 1000 to 1500 ohms that the circuit may be powered by two flashlight batteries.

In the bridge circuit of FIG. 9, the arrangement of the sliding contacts 32, 61 with respect to coil 26 and rheostat 60 constitutes a voltage divider connection. In the modification of FIG. 10 the lower ends of the elements 26' and 60' are not connected to each other, although the former may be connected to the common lead 30'. Hence, the coil 26' and the rheostat 60' constitute variable resistances each of which constitute only one arm of each branch of the bridge circuit. Therefore, fixed resistances 74 and 75 are connected into the circuit to provide the other arm of each branch, respectively. The advantage of the FIG. 10 arrangement over the FIG 9 arrangement is that only a single separate lead (in addition to the common lead 30) is required between each tank and the indicator device 70.

Indicia 76 are provided for the rheostat 60. Where the tanks are identical, the indicia can read directly in gallons; otherwise a separate set of indicia can be provided for each type of tank. In the alternative, the indicia 76 may read in percentage of total capacity.

The several level responsive devices 13 are calibrated with respect to the indicia 76 by means of the adjustable resistances 71 and 72 so as to provide accurate readings.

To summarize the operation, when it is desired to measure the contents of tank 10, for instance, the ganged switches 67 and 68 are moved from the off position to a position registering with the proper leads. In the position of the parts shown in FIG. 9, there will be a greater voltage at the contact arm 61 than at the sliding contact 32 with the result that the galvanometer 64 will indicate the flow of current. The contact arm 61 is therefore adjusted so that the galvanometer 64 reads zero. At this point, when the bridge circuit is balanced, the position of the contact arm 61 is a function of the position of the float device 16, with the result that the liquid level will be indicated by the indicia 76.

In order to check the level of the other tanks, the switches 67 and 68 may be moved into contact with leads 41a–42a and the operation repeated, and then into contact with leads 41b–42b, and so forth.

Preferably, the contact arms 32 and 33 engage the resistance wire 26 and the conductor strip 29, respectively, with a comparatively light pressure, so that the frictional force resisting displacement is of the order of only a few ounces. For example, in the construction shown, a contact pressure of from four to eight ounces results in a frictional resistance of two ounces. This contributes materially to the sensitivity of the device since only a very slight variation of liquid level is necessary to create sufficient buoyancy, or the reverse, to slide the contacts. Thus, it is desirable to make the contact points 58, 59 of a suitable material, such as gold, which will maintain good electrical contact in spite of the relatively light pressure being exerted.

As previously indicated, an outstanding advantage of my tank gauge system is that it eliminates the explosion hazard. There is no sparking at contacts 32 and 33 for the reason that only a small amount of power is involved. Two flashlight batteries provide three volts, and the current running through the resistance wire 26 and the sliding contact 32, 33 is only of the order of a few milliamperes. The leads 30, 41 and 42 are enclosed in a grounded conduit, and the whole circuit is completely isolated from any commercial power line.

In the course of repair or calibration of the control station 70 it is possible that a higher voltage could be inadvertently applied to some lead. This is an explosion hazard because the tanks are commonly grounded as at 55 (FIG. 1). Thus, even though a non-sparking power source is used, a hazard is presented of which, even though the possibility of occurrence may be remote, the consequences would be disastrous.

This hazard may be avoided by grounding the common lead 30 so that there will be no potential difference between the conductor strip 29 and any of the tanks 10.

The ground 63 is located at the control station end of the system, and preferably between the galvanometer 64 and the sliding contacts 32. Additional grounds may be provided. Thus, the advantages of an isolated system are obtained without the necessity of insulating the conductor strip 29 from the float guide 15, or the float guide from the tank 10, either at the top (pressure seal 14) or at the bottom (point 56 of FIG. 1).

Due to my improved arrangement, the float guide 15 can be permitted to rest on the tank bottom at point 56 to reinforce the same against vibration without requiring any insulation between the two, and no insulation is required between the bushing 51 and the wall 12 of the tank 10. This feature simplifies cost of installation. The floats 16 are all at ground potential.

The system can be very easily installed; installation of a level responsive device in a tank involves only the making of an opening in the tank cover 12, the welding in place of the bushing 51, and then the assembly of the screw threaded parts. The plug arrangement 44 permits coarse adjustment of the length of the float guide 15 to be made by the set screws 47, and fine adjustment, in urging the bottom of the float guide into contact with the bottom of the tank, to be made by the screw threaded means 45.

The level responsive device 13 has ben designed to eliminate mechanical defects which would require the removal of the cover 12 incident to inspection, adjustment, or repair, and consequent loss of propane vapor. More particularly, a simplicity of operation has been achieved by combining the float guide and the coil holding structure as a single element, and the parts are arranged so that a balanced force is applied to the float, thus avoiding cocking and binding.

Although my tank gauge system is suitable for use with any storage tank for liquid chemicals of high dielectric strength, when used in connection with propane and butane the level responsive device 13 must be able to withstand the very considerable pressures encountered. For this reason, a non-collapsible float construction has been used, of which there are several suitable types as shown in FIGS. 5, 11, and 13.

While only preferred embodiments of my invention have been shown and described herein, it will be understood that various modifications and changes may be made in the construction shown without departing from the spirit of my invention as pointed out in the appended claims.

I claim:

1. A tank gauge system for a liquid chemical storage tank comprising, in combination,
    a first variable resistance device located in said tank and having a float actuated sliding contact located in said tank,
    a control station which includes a second variable resistance device having a sliding contact,
    means connecting said second variable resistance device to said first variable resistance device,
    means including a power source providing a bridge circuit which includes said variable resistance devices,
    said bridge circuit providing means including a bridge connection between said two contacts,
    and a null reading galvanometer interposed in said bridge connection,
    said null reading galvanometer being located at said control station,
    said storage tank being grounded and said bridge connection being grounded, whereby no potential difference exists between said sliding contact and said tank in which it is located.

2. A tank gauge system as claimed in claim 1 in which said connecting means includes a first lead means connecting one end of said first variable resistance device with one end of said second variable resistance device, and a second lead means connecting the other end of said first variable resistance device with the other end of the second variable resistance device, whereby each of said variable resistance devices constitutes a voltage divider.

3. A tank gauge system as claimed in claim 1 in which each of said variable resistance devices comprises one arm of each branch of said bridge circuit, and
in which said bridge circuit providing means includes two fixed resistances, each constituting the other arm of each branch of said bridge circuit,
the sliding contact of said second variable resistance device having indicia associated therewith for indicating the relative position of said float actuated sliding contact when said sliding contact of said second variable resistance device is adjusted so that said galvanometer reads zero.

4. A tank gauge system for a plurality of liquid storage tanks comprising, in combination,
a plurality of level responsive devices, each including a first voltage divider having a float actuated sliding contact,
each of said devices being disposed in one of said tanks and being partially submerged in the liquid contained therein,
a control station which includes a second voltage divider having an adjustable contact,
means selectively connecting said second voltage divider to one of said first voltage dividers, and
means including a power source providing a bridge circuit which includes said voltage dividers,
said bridge circuit including a bridge connection between said sliding contact and said adjustable contact,
and a null reading galvanometer interposed in said bridge connection,
said null reading galvanometer being located at said control station,
said storage tanks being grounded, and said bridge connection including a common lead electrically connected to all of said sliding contacts, said common lead being grounded, whereby no potential difference exists between any sliding contact and the tank in which it is located.

5. A tank gauge system as claimed in claim 4 in which said bridge connection includes a common lead electrically connected to all of said sliding contacts.

6. A tank gauge system as claimed in claim 5 in which said level responsive device includes a metallic float guide and said first voltage divider includes a coil of resistance wire supported by said float guide.
a float device slidably mounted on said float guide,
said first sliding contact being mounted on said float device,
a second sliding contact mounted on said float device and electrically connected to said first sliding contact for effecting electrical connection between said first sliding contact and said common lead.

7. A level responsive device for a tank gauge system comprising
a vertically disposed float guide adapted for location in a liquid storage tank, and
a float device cooperating therewith,
said float guide having a vertically extending recess formed in a surface thereof,
a resistance coil mounted in said recess whereby a portion of said resistance coil is exposed for cooperation with a sliding contact,
and a vertically extending low resistance conductor strip mounted on another surface of said float guide,
said float device comprising,
a sleeve surrounding said float guide,
float means connected to said sleeve,
a sliding contact mounted on said sleeve for cooperation with said resistance coil, and
a second contact electrically connected to said sliding contact and mounted on said sleeve for cooperation with said conductor strip whereby said conductor strip provides a non-flexible low resistance electric connection between said sliding contact and an electric circuit.

8. A level responsive device for a tank gauge system comprising
a vertically disposed float guide adapted for location in a liquid storage tank, and
a float device cooperating therewith,
said float guide comprising,
a shell,
a core disposed within said shell,
a resistance coil mounted on said core,
a continuous slot in said shell whereby a portion of said resistance coil is exposed for cooperation with a sliding contact, and
a low resistance return strip mounted on said shell,
said float device comprising
a sleeve slidably mounted on said shell,
float means connected to said sleeve,
a sliding contact mounted on said sleeve for cooperation with said resistance coil, and
a second contact mounted on said sleeve for cooperation with said return strip,
said contacts being electrically connected to each other.

9. A level responsive device as claimed in claim 8 in which said float means comprises a plurality of sealed tubular float members mounted on opposite sides of said sleeve, said tubular float members being of relatively small diameter so as to withstand a pressure of substantially 300 pounds per square inch.

10. A level responsive device as claimed in claim 8 in which said float means comprises a float member formed of foamed metal.

11. A level responsive device as claimed in claim 8 in which said float means comprises a hollow, vented, self-bailing float member.

12. A level responsive device as claimed in claim 8 in which said core is bonded to said shell at spaced intervals by an epoxy resin.

13. A level responsive device as claimed in claim 8 in which said shell is formed of anodized aluminum.

14. A level responsive device as claimed in claim 8 in which said shell is provided with lands for cooperation with said sleeve.

15. A level responsive device for a tank comprising,
a vertically disposed float guide located in said tank, and including
a shell,
a resistance coil mounted within said shell,
a continuous slot in said shell whereby a portion of said resistance coil is exposed for cooperation with a sliding contact,
and a low resistance return strip mounted on said shell,
a float device slidably mounted on and cooperating with said float guide,
two electrically connected sliding contacts mounted on said float device and engaging said resistance coil and said return strip, respectively, and
means for mounting said float guide in said tank.

16. A liquid level responsive device for a grounded pressure tank comprising a vertically disposed float guide located in said tank,
a float device slidably mounted on and cooperating with said float guide, said float guide including a resistance coil and a return strip, and said float device including sliding contact means cooperating with said resistance coil and said return strip to provide a variable resistance device, pressure seal means for mounting said float guide in the upper portion of said tank with the lower end of said float guide abutting the bottom of said tank, said pressure seal mounting means including, a threaded bushing mounted in the top wall of said tank, an externally threaded hollow plug cooperating with said bushing in pressure tight relationship, said float guide being received at its upper end in said hollow plug, set screws securing said float guide to said plug, said return strip having a lead and said resistance coil having two insulated leads extending upwardly through said plug, and means for sealing said three leads to said plug in pressure tight relationship, said float guide being formed of a conducting material and being in electrical contact with said return strip, whereby a grounding of said return strip lead will avoid the occurrence of a potential difference across said set screws and the screw threaded connection between said plug and said bushing.

17. A tank gauge system for a liquid storage tank which includes a level responsive device including a first voltage divider located in said tank, a control station including a second voltage divider having an adjustable contact 61, means including a power source and a bridge connection 30 providing a bridge circuit which includes said voltage dividers in each branch thereof, characterized in that said level responsive device includes a vertically disposed hollow float guide disposed in said tank with its lower end extending into the liquid contents thereof, a float device cooperating therewith, said hollow float guide having a vertically extending slot formed in the surface thereof, said first voltage divider including a resistance coil insulated from and disposed within said hollow float guide and having a portion thereof exposed by said slot, and a vertically extending low resistance conductor strip mounted on the surface of said float guide, said conductor strip constituting one end of said bridge connection, the other end of said bridge connection being connected to said adjustable contact, and said float device including sliding contact means making electrical connection between said resistance coil and said conductor strip, and a null reading galvanometer interposed in said bridge connection and located at said control station.

References Cited by the Examiner

UNITED STATES PATENTS

| | | | |
|---|---|---|---|
| Re. 15,580 | 4/1923 | Trumble | 73—322.5 X |
| 459,919 | 9/1891 | Tilghman | 73—322.5 X |
| 1,231,964 | 7/1917 | Suchanek | 73—313 |
| 1,867,870 | 7/1932 | Baker et al. | 73—342 |
| 1,928,970 | 10/1933 | Johnston | 33—205.5 |
| 2,112,371 | 4/1938 | Korvec | 73—313 |
| 2,343,425 | 4/1941 | Smith | 338—176 |
| 2,627,178 | 1/1953 | Hayward et al. | 73—313 |
| 2,678,074 | 5/1954 | Adams | 73—322.5 X |
| 2,745,087 | 5/1956 | Dickinson | 73—313 |
| 2,751,289 | 6/1956 | Elliott | 75—67 X |
| 2,758,474 | 8/1956 | McKinney | 73—313 |
| 2,910,940 | 11/1959 | Colman | 73—304 |

OTHER REFERENCES

Roberts, H. C.: Mechanical Measurements by Electrical Methods, Pittsburgh, The Instruments Publishing Co. Inc., pages 130 and 222. (Copy in Group 430.)

LOUIS R. PRINCE, *Primary Examiner.*

ISAAC LISANN, *Examiner.*

S. H. BAZERMAN, *Assistant Examiner.*